(12) United States Patent
Ouhadi

(10) Patent No.: US 6,414,081 B1
(45) Date of Patent: Jul. 2, 2002

(54) COMPATIBILIZED BLENDS OF NON-POLAR THERMOPLASTIC ELASTOMERS AND POLAR THERMOPLASTIC POLYMERS

(75) Inventor: Trazollah Ouhadi, Liege (BE)

(73) Assignee: Advanced Elastomer Systems, LP., Akron, OH (US)

( * ) Notice: Subject to any disclaimer, the term of this patent is extended or adjusted under 35 U.S.C. 154(b) by 0 days.

(21) Appl. No.: 09/555,036

(22) PCT Filed: Dec. 2, 1998

(86) PCT No.: PCT/EP98/07818

§ 371 (c)(1),
(2), (4) Date: May 23, 2000

(87) PCT Pub. No.: WO99/29777

PCT Pub. Date: Jun. 17, 1999

(30) Foreign Application Priority Data

Dec. 4, 1997 (EP) .............................................. 97121288

(51) Int. Cl.[7] .......................... C08L 77/00; C08L 67/00; C08L 59/00; C08L 75/04; C08L 71/02
(52) U.S. Cl. ........................... 525/66; 525/69; 525/125; 525/133; 525/155; 525/166; 525/179
(58) Field of Search .............................. 525/66, 69, 125, 525/133, 155, 166, 179

(56) References Cited

U.S. PATENT DOCUMENTS

| 4,883,837 A | * 11/1989 | Zabrocki | 525/66 |
| 5,605,961 A | * 2/1997 | Lee et al. | 525/66 |
| 5,623,019 A | * 4/1997 | Wiggin et al. | 525/92 |
| 5,843,577 A | * 12/1998 | Ouhadi et al. | 428/474.7 |
| 6,300,418 B1 | * 10/2001 | Brzoskowski et al. | 525/191 |
| 6,326,084 B1 | * 12/2001 | Ouhadi et al. | 428/474.7 |

\* cited by examiner

*Primary Examiner*—Ana Woodward
(74) *Attorney, Agent, or Firm*—William A. Skinner

(57) ABSTRACT

The invention relates to compatibilized blends comprising
  a non-polar thermoplastic elastomer,
  a polar thermoplastic polymer selected from thermoplastic polyurethane (TPU), chloro containing polymers, fluoro containing polymers, polyesters, acrylonitrile-butadiene-styrene copolymers, styrene-acrylonitrile copolymers, styrene-maleic anhydride copolymer, polyacetal, polycarbonate, polyphenylene oxide, and
  a suitable compatibilizer.

11 Claims, No Drawings

COMPATIBILIZED BLENDS OF NON-POLAR THERMOPLASTIC ELASTOMERS AND POLAR THERMOPLASTIC POLYMERS

BACKGROUND OF THE INVENTION

Field of the Invention

The present invention relates to compatibilized blends of non-polar polyolefinic thermoplastic elastomers and polar thermoplastic polymers which have been compatibilized by a suitable compatibilizer. Furthermore, the present invention relates to shaped articles consisting of said compatibilized blends.

The concept of using compatibilizers as interfacial agent in polymer blends is almost as old as the polymers themselves. For a detailed background information it is referred to: "Polymer Blends" by D. R. Paul and S. Newman, Volume 1, 2, Academic Press, Inc., 1978.

As widely described in the literature, a remarkable balance of diverse properties is achievable with blends of different polymers, provided that a suitable stability of the morphology between the different polymeric ingredients of the blend is achieved.

The object of the present invention is to provide blends of specific polymers which, under normal circumstances, would be incompatible with each other, and consequently their blends show poor physical properties or in many cases they can not or can only hardly be blended, mixed or otherwise processed. In detail, it is an object of the present invention to provide compatibilized blends of non-polar thermoplastic elastomers with polar thermoplastic polymers thus achieving improved properties of the final product blend which resemble the properties of both components in the blends.

For instance, polyvinylidene fluoride (PVDF) is an inert flexible thermoplastic which is known for its excellent resistance to chemicals and fluids and its abrasion resistance. Furthermore, PVDF has a high service temperature and a low surface coefficient of friction. Another example for thermoplastic polymer would be thermoplastic urethanes (TPU) which are known for their bonding to different polar substrates such as ABS, PVC, etc., its paintability, abrasion resistance and gloss. Both, PVDF and TPU are incompatible with non-polar thermoplastic elastomers, i.e., they do not form homogeneous blend nor can they be satisfactorily processed. The overall physical properties of such incompatible "blends" are poor.

The same situation is faced when an attempt is made to blend the polar polyvinylidene chloride (PVDC), polyvinyl chloride (PVC) or polyesters with the non-polar thermoplastic elastomers.

The object of the present invention has surprisingly been solved by the addition of a suitable compatibilizer to the blend comprising the non-polar thermoplastic elastomer and the polar thermoplastic polymers.

A further object of the present invention is the provision of a compatibilized blend of non-polar thermoplastic elastomers with polar thermoplastic polymers showing good adhesion to polar substrates, in particular to polar polymeric substrates.

DESCRIPTION OF THE INVENTION

In detail the present invention relates to a compatibilized blend comprising
  a non-polar thermoplastic elastomer,
  a polar thermoplastic polymer selected from thermoplastic polyurethane (TPU), chloro containing polymers, fluoro containing polymers, polyesters, acrylonitrile-butadiene-styrene copolymers, styrene-acrylonitrile copolymers, styrene-maleic anhydride copolymer, polyacetal, polycarbonate, polyphenylene oxide, and
  a compatibilizer.

The compatibilized blends of the present invention comprise
  50 to 98% by weight, preferably 60 to 95% by weight, most preferably 70 to 90% by weight of the non-polar thermoplastic elastomer,
  50 to 2% by weight, preferably 40 to 5% by weight, most preferably 30 to 10% by weight of the polar thermoplastic polymer,
based on the total amount of the non-polar thermoplastic elastomer(s) and the polar hermoplastic polymer.

In terms of the present invention the term "non-polar thermoplastic elastomer" means that the thermoplastic component is a polyolefinic polymer including optional additives. Likewise the term "polar thermoplastic polymer" means a thermoplastic polymer which contains in its molecular structure at least one atom selected from nitrogen, oxygen and halogen in addition to carbons and hydrogens.

The term "non-polar thermoplastic elastomer" also extends to blends of different but compatible non-polar thermoplastic elastomers. Likewise the term "polar thermoplastic polymer" as used in the description and the claims also extends to blends of different but compatible polar thermoplastic polymers.

Of course, the compatibilized blend may contain optional additives which can be added to blend as such or as additives of its constituents.

DESCRIPTION OF THE PREFERRED EMBODIMENTS

1. Non-polar Thermoplastic Elastomer

The term "thermoplastic elastomer" (TPE) in general defines blends of polyolefins and rubbers in which blends the rubber phase is not cured, i.e., so called thermoplastic olefins (TPO), blends of polyolefins and rubbers in which blends the rubber phase has been partially or fully cured by a vulcanization process to form thermoplastic vulcanizates (TPV), or unvulcanized block-copolymers or blends thereof.

According to the present invention the non-polar thermoplastic elastomer is selected from
(A)
  (a) a thermoplastic polyolefin homopolymer or copolymer, and
  (b) an olefinic rubber which is fully crosslinked, partially crosslinked or not crosslinked, and optionally
  (c) common additives;
(B)
  (a) a block-copolymer of styrene/conjugated diene/styrene and/or its fully or partially hydrogenated derivative, optionally compounded with
  (b) a thermoplastic polyolefin homopolymer or copolymer and/or
  (c) common additives and
(C) any blend of (A) and (B).

1.1 Non-polar Thermoplastic Elastomer (A)
1.1.1 Thermoplastic Polyolefin

Polyolefins suitable for use in the compositions (A), (B) or (C) of the invention include thermoplastic, crystalline polyolefin homopolymers and copolymers. They are desirably prepared from monoolefin monomers having 2 to 7 carbon atoms, such as ethylene, propylene, 1-butene, isobutylene, 1-pentene, 1-hexene, 1-octene, 3-methyl-1- pentene, 4-methyl-1-pentene, 5-methyl-1-hexene, mixtures thereof and copolymers thereof with (meth)acrylates and/or vinyl acetates. Preferred, however, are monomers having 3 to 6 carbon atoms, with propylene being preferred. As used in the specification and claims the term polypropylene includes homopolymers of propylene as well as reactor and/or random copolymers of polypropylene which can contain about 1 to about 30 wt % of ethylene and/or an a-olefin comonomer of 4 to 16 carbon atoms, and mixtures thereof. The polypropylene can be highly crystalline isotactic or syndiotactic polypropylene. Commercially available polyolefins may be used in the practice of this invention. Further polyolefins which can be used in terms of the invention are high, low, linear-low, very low-density polyethylenes and copolymers of ethylene with (meth)acrylates and/or vinyl acetates.

The polyolefins mentioned above can be made by conventional Ziegler/Natta catalyst-systems or by single-site catalyst-systems.

The amount of polyolefin found to provide useful compositions (A) is generally from about 8 to about 90 weight percent, under the proviso that the total amount of polyolefin (a) and rubber (b) is at least about 35 weight percent, based on the total weight of the polyolefin (a), rubber (b) and optional additives (c). Preferably, the polyolefin content will range from about 10 to about 60 percent by weight.

1.1.2 Olefinic Rubber

Suitable monoolefin copolymer rubbers comprise non-polar, rubbery copolymers of two or more ($\alpha$-monoolefins, preferably copolymerized with at least one polyene, usually a diene. Saturated monoolefin copolymer rubber, for example ethylene-propylene copolymer rubber (EPM) can be used. However, unsaturated monoolefin rubber such as EPDM rubber is more suitable. EPDM is a terpolymer of ethylene, propylene and a non-conjugated diene. Satisfactory non-conjugated dienes include 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD) and vinyl norbornene (VNB).

Butyl rubbers are also useful in the compositions of the invention. As used in the specification and claims, the term "butyl rubber" includes copolymers of an isoolefin and a conjugated monoolefin, terpolymers of an isoolefin with or without a conjugated monoolefin, divinyl aromatic monomers and the halogenated derivatives of such copolymers and terpolymers.

The useful butyl rubber copolymers comprise a major portion of isoolefin and a minor amount, usually less than about 30 wt %, of a conjugated multiolefin. The preferred copolymers comprise about 85–99.5 wt % of a $C_{4-7}$ isoolefin such as isobutylene and about 15–0.5 wt % of a multiolefin of 4–14 carbon atoms, such as isoprene, butadiene, dimethyl butadiene and piperylene. Commercial butyl rubber, chlorobutyl rubber, bromobutyl rubber, useful in the invention, are copolymers of isobutylene and minor amounts of isoprene with less than about 3% halogen for the halobutyl-derivatives. Other butyl co- and terpolymer rubbers are illustrated by the description in U.S. Pat. No. 4,916,180, the disclosure of which is incorporated herein by reference.

Another suitable copolymer within the scope of the olefinic rubber of the present invention is a copolymer of a $C_{4-7}$ isomonoolefin and a para-alkylstyrene, and preferably a halogenated derivative thereof. The amount of halogen in the copolymer, predominantly in the para-alkylstyrene, is from about 0.1 to 10 wt %. A preferred example is the brominated copolymer of isobutylene and para-methylstyrene. These copolymers are more fully described in U.S. Pat. No. 5,162,445, the disclosure of which is incorporated herein by reference.

A further olefinic rubber suitable in the invention is natural rubber. The main constituent of natural rubber is the linear polymer cis-1,4-polyisoprene. It is normally commercially available in the form of smoked sheets and crepe. Synthetic polyisoprene can also be used. Furthermore polybutadiene rubber and styrene-butadiene-copolymer rubbers can also be used.

Blends of any of the above olefinic rubbers can be employed, rather than a single olefinic rubber.

Further suitable rubbers are nitrite rubbers. Examples of the nitrile group-containing rubber include a copolymer rubber comprising an ethylenically unsaturated nitrile compound and a conjugated diene. Further, the copolymer rubber may be one in which the conjugated diene units of the copolymer rubber are hydrogenated. Specific examples of the ethylenically unsaturated nitrile compound include acrylonitrile, $\alpha$-chloroacrylonitrile, $\alpha$-fluoroacrylonitrile and methacrylonitrile. Among them, acrylonitrile is particularly preferable.

Examples of the conjugated diene include 1,3-butadiene, 2-chlorobutadiene and 2-methyl-1,3-butadiene (isoprene). Among them, butadiene is particularly preferable. Especially preferred nitrite rubbers comprise copolymers of 1,3-butadiene and about 10 to about 50 percent of acrylonitrile.

Other suitable rubbers in terms of the present invention are based on polychlorinated butadienes such as polychloroprene rubber. These rubbers are commercially available under the trade names Neoprene® and Bayprene®.

In preparing the compositions of the invention, the amount of rubber in composition (A) generally ranges from about 70 to about 10 weight percent, under the proviso that the total amount of polyolefin (a) and rubber (b) is at least about 35 weight %, based on the weight of the polyolefin (a), the rubber (b) and the optional additives (c). Preferably, the olefinic rubber content will be in the range of from about 50 to about 10 weight percent.

1.1.3 Vulcanization

If cured, the process of dynamically curing the rubber in the polyolefin matrix is employed. The process of dynamically curing the rubber in a polyolefin matrix is well known in the art. Early work found in U.S. Pat. No. 3,037,954 discloses the technique of dynamic vulcanization wherein a vulcanizable elastomer is dispersed into a resinous thermoplastic polymer and the elastomer is cured in the presence of a curative while continuously mixing and shearing the polymer blend. The resulting composition [dynamically vulcanized alloy, or thermoplastic vulcanizate (TPV)] is a microgel dispersion of cured elastomer in an uncured matrix of thermoplastic polymer. Since then the technology has advanced significantly. For further general background information it is referred to EP-A-0 473 703, EP-A-0 657 504, WO-A-95/25380 and other patent applications of the applicant the disclosure of which is incorporated herein by reference.

The elastomer (rubber) component of the TPV can be uncured, partially or fully vulcanized (crosslinked). Those ordinarily skilled in the art will appreciate the appropriate quantities, types of cure systems and vulcanization conditions required to carry out the vulcanization of the rubber. The elastomer can be vulcanized using varying amounts of curative, varying temperatures and varying time of cure in order to obtain the optimum crosslinking desired. Any known cure system can be used, so long as it is suitable under the vulcanization conditions for the elastomer or combination of elastomers being used and is compatible with the thermoplastic polyolefin component of the TPV. These curatives include sulfur, sulfur donors, metal oxides, phenolic resin systems, maleimides, peroxide-based systems, high energy radiation and the like, both with and without accelerators and co-agents. Another curing system which can be used is the hydrosilylation system which consists of the use of a silicon hydride curative catalyzed with a platinum or rhodium derivative. Such systems are disclosed, for instance, in EP-A-0776937. Phenolic resin curatives are preferred for the preparation of the TPV composition of the invention, and such cure systems are well known in the art and literature of vulcanization of elastomers. Their use in TPV compositions is more fully described in U.S. Pat. No. 4,311,628, the disclosure of which is fully incorporated herein by this reference. Usually 5 to 20 weight parts of the curative or curative system are used per 100 weight parts of the rubber to be cured.

1.2 Thermoplastic Elastomer (B)

Another thermoplastic elastomer (B) is a block-copolymer of styrene/conjugated diene/styrene, with the conjugated diene optionally being fully or partially hydrogenated, or mixtures thereof. Generally this block-copolymer may contain about 10 to about 50 weight %, more preferably about 25 to about 35 weight % of styrene and about 90 to about 50 weight %, more preferably about 75 to about 35 weight % of the conjugated diene, based on said block-copolymer. Most preferably, however, is a block-copolymer which contains about 30 weight % of styrene and about 70 weight % of the conjugated diene. The conjugated diene is selected from butadiene, isoprene or mixtures thereof. Specific block-copolymers of the styrene/conjugated diene/styrene-type are SBS, SIS, SIBS, SEBS and SEPS block-copolymers. These block-copolymers are known in the art and are commercially available.

Optionally the block-copolymer may further be compounded with a polyolefin or a common additive or mixtures thereof. Thus, the thermoplastic elastomer (B) optionally further comprises up to about 60 weight % of (b) the thermoplastic polyolefin homopolymer or copolymer or the additives or mixtures thereof, based on the total weight of the block-copolymer (a) and (b). Preferably, the thermoplastic elastomer (B) comprises at least 10 weight % of the thermoplastic polyolefin. The thermoplastic polyolefins are selected from those mentioned above in context with the thermoplastic elastomer (A).

1.3 Thermoplastic Elastomer (C)

Other thermoplastic elastomers which can be modified with modifier mentioned herein below are blends of the thermoplastic elastomer (A) comprising the polyolefin, rubber and optionally additives with the thermoplastic elastomer (B) comprising the block-copolymer, optionally polyolefins and/or additives.

Preferred blends (C) contain about 5 to about 95 weight % of (A) and about 95 to about 5 weight % of (B) respectively, based on the total amount of (A) and (B). These blends can be prepared by common blending-processes known in the art.

2. Polar Thermoplastic Polymer

According to the present invention the polar thermoplastic polymer is selected from thermoplastic polyurethanes (TPU), chlorine containing polymers, for instance, polyvinylidene chloride (PVDC), polyvinylchloride (PVC), chlorinated polyethylene (CPE), fluorine containing polymers, for instance, polyvinylidene fluoride (PVDF), polyesters, acrylonitrile-butadiene-styrene copolymer (ABS), styrene-acrylonitrile copolymer (SAN), styrene-maleic anhydride copolymer (SMA), polyacetals, polycarbonates, polyphenylene oxide.

2.1 Thermoplastic Polyurethane (TPU)

The polyurethane component has no limitation in respect of its formulation other than the requirement that it be thermoplastic in nature which means that it is prepared from substantially difunctional ingredients, i.e., organic diisocyanates and components being substantially difunctional in active hydrogen containing groups.

However, often times minor proportions of ingredients with functionalities higher than 2 may be employed. This is particularly true when using extenders such as glycerol, trimethylol propane, and the like. Such thermoplastic polyurethane compositions are generally referred to as TPU materials. Accordingly, any of the TPU materials known in the art can be employed within the scope of the present invention. For representative teaching on the preparation of TPU materials see Polyurethanes: Chemistry and Technology, Part II, Saunders and Frisch, 1964, pp 767 to 769, Interscience Publishers, New York, N.Y. and Polyurethane Handbook, Edited by G. Oertel 1985, pp 405 to 417, Hanser Publications, distributed in U.S.A. by Macmillan Publishing Co., Inc., New York, N.Y. For particular teaching on various TPU materials and their preparation see U.S. patent publications U.S. Pat. Nos. 2,929,800; 2,948,691; 3,493,634; 3,620,905; 3,642,964; 3,963,679; 4,131,604; 4,169,196; Re 31,671; 4,245,081; 4,371,684; 4,379,904; 4,447,590; 4,523,005; 4,621,113; 4,631,329; and 4,883,837, the disclosure of which is incorporated herein by reference.

The preferred TPU is a polymer prepared from a mixture comprising at least one organic diisocyanate, at least one polymeric diol and at least one difunctional extender. The TPU may be prepared by the prepolymer, quasi-prepolymer, or one-shot methods in accordance with the methods described in the references cited above.

Any of the organic diisocyanates previously employed in TPU preparation can be employed including blocked or unblocked aromatic, aliphatic, and cycloaliphatic diisocyanates, and mixtures thereof.

Illustrative isocyanates but non-limiting thereof are methylene bis(phenyl isocyanate) including the 4,4'-isomer, the 2,4'-isomer and mixtures thereof, m- and p-phenylene diisocyanates, chlorophenylene diisocyanates, α,α'-xylylene diisocyanate, 2,4- and 2,6-toluene diisocyanate and the mixtures of these latter two isomers which are available commercially, tolidine diisocyanate, hexamethylene diisocyanate, 1,5-naphthalene diisocyanate, isophorone diisocyanate and the like; cycloaliphatic diisocyanates such as methylene bis(cyclohexyl isocyanate) including the 4,4'-isomer, the 2,4'-isomer and mixtures thereof, and all the geometric isomers thereof including trans/trans, cis/trans, cis/cis and mixtures thereof, cyclohexylene diisocyanates (1,2-; 1,3-; or 1,4-), 1-methyl-2,5-cyclohexylene diisocyanate, 1-methyl-2,4-cyclohexylene diisocyanate, 1-methyl-2,6-cyclohexylene diisocyanate, 4,4'-isopropylidene bis-(cyclohexyl isocyanate), 4,4'-diisocyanato dicyclohexyl, and all geometric isomers and mixtures thereof, and the like. Also included are the modified forms of methylene bis(phenyl isocyanate). By the latter are meant those forms of methylene bis(phenyl isocyanate) which have been treated to render them stable liquids at ambient temperature (about 20° C.). Such products include those which have been reacted with a minor amount (up to about 0.2 equivalents per equivalent of polyisocyanate) of an aliphatic glycol or a mixture of aliphatic glycols such as the modified methylene bis(phenyl isocyanates) described in U.S. Pat. Nos. 3,394,164; 3,644,457; 3,883,571; 4,031,026; 4,115,429; 4,118,411; and 4,299,347 the disclosure of which is incorporated herein by reference. The modified methylene bis(phenyl isocyanates) also include those which have been treated so as to convert a minor proportion of the diisocyanate to the corresponding carbodiimide which then interacts with further diisocyanate to form urethane-imine groups, the resulting product being a stable liquid at ambient temperatures as described, for example, in U.S. Pat. No. 3,384,653. Mixtures of any of the above-named polyisocyanates can be employed if desired.

Preferred classes of organic diisocyanates include the aromatic and cycloaliphatic diisocyanates. Preferred species within these classes are methylene bis(phenyl isocyanate) including the 4,4'-isomer, the 2,4'-isomer, and mixtures thereof, and methylene bis(cyclohexyl isocyanate) inclusive of the isomers described above.

The polymeric diols which can be used are those conventionally employed in the art for the preparation of TPU elastomers. The polymeric diols are responsible for the formation of soft segments in the resulting polymer and advantageously have molecular weights (number average) falling in the range of 400 to 4000 and preferably 500 to 3000. It is not unusual, and, in some cases, it can be advantageous to employ more than one polymeric diol. Exemplary of the diols are polyether diols, polyester diols, hydroxy-terminated polycarbonates, hydroxy-terminated polybutadienes, hydroxy-terminated polybutadiene-acrylonitrile copolymers, hydroxy-terminated copolymers of dialkyl siloxane and alkylene oxides such as ethylene oxide, propylene oxide and the like, and mixtures in which any of the above polyols are employed as major component (greater than 50% w/w) with amino-terminated polyethers and amino-terminated polybutadiene-acrylonitrile copolymers.

Illustrative of polyether polyols are polyoxyethylene glycols, polyoxypropylene glycols which, optionally, have been capped with ethylene oxide residues, random and block copolymers of ethylene oxide and propylene oxide; polytetramethylene glycol, random and block copolymers of tetrahydrofuran and ethylene oxide and/or propylene oxide, and products derived from any of the above reaction with di-functional carboxylic acids or ester derived from said acids in which latter case ester interchange occurs and the esterifying radicals are replaced by polyether glycol radicals. The preferred polyether polyols are random and block copolymers of ethylene and propylene oxide of functionality approximately 2.0 and polytetramethylene glycol polymers of functionality about 2.0.

Illustrative of polyester polyols are those prepared by polymerizing ε-caprolactone using an initiator such as ethylene glycol, ethanolamine, and the like; and those prepared by esterification of polycarboxylic acids such as phthalic, terephthalic, succinic, glutaric, adipic, azelaic, and the like; acids with polyhydric alcohols such as ethylene glycol, butanediol, cyclohexane dimethanol, and the like.

Illustrative of the amine-terminated polyethers are the aliphatic primary di-amines structurally derived from polyoxypropylene glycols. Polyether diamines of this type are available from Jefferson Chemical Company under the trademark JEFFAMINE®.

Illustrative of polycarbonates containing hydroxyl groups are those prepared by reaction of diols such as propane-1,3-diol, butane-1,4-diol, hexane-1,6-diol, 1,9-nonanediol, 2-methyloctane-1,8-diol, diethylene glycol, triethylene glycol, dipropylene glycol, and the like, with diarylcarbonates such as diphenylcarbonate or with phosgene.

Illustrative of the silicon-containing polyethers are the copolymers of alkylene oxides with dialkylsiloxanes such as dimethylsiloxane, and the like; see, for example, U.S. Pat. Nos. 4,057,595 or 4,631,329 cited supra.

Illustrative of the hydroxy-terminated polybutadiene copolymers are the compounds available under the tradename Poly BD Liquid Resins. Illustrative of the hydroxy- and amine-terminated butadiene/acrylonitrile copolymers are the materials available under the trade name HYCAR® hydroxyl-terminated (HT) liquid polymers and amine-terminated (AT) liquid polymers, respectively. Preferred diols are the polyether and polyester diols set forth above.

The difunctional extender employed can be any of those known in the TPU art disclosed above. Typically the extenders can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexandimethanol; hydroquinone bis-(hydroxy-ethyl)ether, cyclohexylenediols (1,4-, 1,3-, and 1,2-isomers), isopropylidene bis(cyclohexanols); diethylene glycol, dipropylene glycol, ethanolamine, N-methyl-diethanolamine, and the like; and mixtures of any of the above. As noted previously, in some cases minor proportions (less than about 20 equivalent percent) of the difunctional extender may be replaced by trifunctional extenders without detracting from the thermoplasticity of the resulting TPU; illustrative of such extenders are glycerol, trimethylolpropane, and the like.

While any of the diol extenders described and exemplified above can be employed alone, or in admixture, it is preferred to use 1,4-butanediol, 1,6-hexanediol, neopentyl glycol, 1,4-cyclohexanedimethanol, ethylene glycol, and diethylene glycol, either alone or in admixture with each other or with one or more aliphatic diols previously named. Particularly preferred diols are 1,4-butanediol, 1,6-hexanediol, and 1,4-cyclohexanedimethanol.

The equivalent proportions of polymeric diol to said extender can vary considerably depending on the desired hardness for the TPU product. Generally speaking, the proportions fall within the respective range of from about 1:1 to about 1:20, preferably from about 1:2 to about 1:10. At the same time the overall ratio of isocyanate equivalents to equivalents of active hydrogen containing materials is within the range of 0.90:1 to 1.10:1, and preferably, 0.95:1 to 1.05:1.

The TPU's can be prepared by conventional methods which are known to the artisan, for instance from U.S. Pat. No. 4,883,837 and the further references cited therein.

2.2 Chlorine Containing Polymers

The chlorine containing polymers are selected from polyvinylchioride, polyvinylidene copolymer, chlorinated polyvinylchloride, chlorinated polyethylene, and the like.

2.3 Fluorine Containing Polymers

The fluorine containing polymers are selected from polyvinylidene fluoride, vinylidene fluoride-hexafluoropropylene copolymer, and the like.

2.4 Polyester

In terms of the present invention any commercial thermoplastic polyester such as polyethylene terephthalate, polybutylene terephthalate, saturated or unsaturated aliphatic polyesters, and the like can be used.

3. Compatibilizer

According to the present invention the compatibilizer is selected from (i) a copolymer obtainable by condensation reaction of about 10 to about 90 weight % of a functionalized polymer with about 90 to about 10 weight % of a polyamide, based on the total weight of functionalized polymer and polyamide, or (ii) a blend of functionalized polymer and a polyamide in the amounts defined under (i) or (iii) a mixture of (i) and (ii), under the proviso that the functionalized polymer contains not less than about 0.3 weight % based on the total weight of the functionalized polymer, at least one functional group containing comonomer.

The compatibilizer is added to the blend of the non-polar thermoplastic elastomer and the polar thermoplastic polymer in an amount of at least 1 part by weight, preferably 3 to 40 parts by weight and most preferably 5 to 20 parts by weight based on 100 weight parts of the blend comprising the non-polar thermoplastic elastomer and the polar thermoplastic polymer.

According to the present invention the functionalized polymer used in the compatibilizer is selected from functionalized polyolefins and functionalized block-copolymers of styrene/conjugated diene/styrene. In the functionalized block-co-polymers of styrene/conjugated diene/styrene the conjugated diene may be hydrogenated, non-hydrogenated or partially hydrogenated.

The presence of a copolymer of functionalized polymers and polyamide in the thermoplastic elastomers significantly improves the compatibility of non-polar thermoplastic elastomers with polar thermoplastic polymers. The copolymers of functionalized polymers and polyamides can be prepared by condensation reaction of functionalized polymers and polyamides. This type of reaction is known to those skilled in the art (F. Ide and A. Hasegawa, J. Appl. Polym. Sci., 18 (1974) 963; S. Hosoda, K. Kojima, Y. Kanda and M. Aoyagi, Polym. Networks Blends, 1 (1991) 51; S. J. Park, B. K. Kim and H. M. Heong, Eur. Polym. J., 26 (1990)131). The reactions described in these references can easily be transferred to the other functionalized polymers mentioned below.

The polyolefins of the functionalized polyolefins include thermoplastic, crystalline polyolefin homopolymers and copolymers. They are desirably prepared from α-monoolefin monomers having 2 to 7 carbon atoms such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferred, however, are monomers having 3 to 6 carbon atoms, with propylene being preferred. As used in the specification and claims the term polypropylene includes homopolymers of propylene as well as reactor copolymers of polypropylene which can contain 1 to 20 weight % of ethylene or an α-olefin comonomer of 4 to 16 carbon atoms, and mixtures thereof. The polypropylene can be highly crystalline isotactic or syndiotactic polypropylene. Commercially available polyolefins may be used in the practice of the invention. Further preferable among the polyolefins are low-density polyethylene, linear low-density polyethylene, medium- and high-density polyethylene, polypropylene, and propylene-ethylene random or block co-polymers as well as ethylene-vinylacetate copolymer (EVA), ethylene-acrylic acid copolymer (EAA) and their ionomeric derivatives, such as the Zn- and Na-containing salts, and ethylene-(meth) acrylate copolymer, such as EMA.

In the block-copolymers of styrene/conjugated diene/ styrene, which are traditionally made by anionic polymerization and in which the conjugated diene may be hydrogenated, non-hydrogenated or partially hydrogenated, the conjugated diene is selected from butadiene, isoprene or a mixture of both. Specific block-copolymers of the styrene/conjugated diene/styrene-type are SBS, SIS, SIBS, SEBS and SEPS block-copolymers.

The functionalized polymers contain one or more functional groups which have been incorporated either by grafting or by copolymerization. Preferably the functionalized polymers used in this invention are those obtained by grafting at least one kind of functional group-containing monomer on the polymer backbone, which is, as mentioned above, selected from the polyolefins or the block-copolymers. It is preferred, however, to use one kind of functional group-containing monomer. The functional group-containing monomers are selected from carboxylic acids, dicarboxylic acids, their derivatives such as their anhydrides, oxazoline- or epoxy-group containing monomers, or amino- or hydroxy-group containing monomers.

Examples of the monomers containing one or two carboxylic groups are those having 3 to 20 carbon atoms per molecule such as acrylic acid, methacrylic acid, maleic acid, fumaric acid and itaconic acid or derivatives thereof.

Unsaturated dicarboxylic acid monomers having 4 to 10 carbon atoms per molecule and anhydrides (if they exist) thereof are the preferred grafting monomers. These grafting monomers include for example, maleic acid, fumaric acid, itaconic acid, citra-conic acid, cyclohex4-ene-1,2-dicarboxylic acid, bicyclo[2.2.1]hept-5-ene-2,3-dicarboxylic acid, maleic anhydride, itaconic anhydride, citraconic anhydride, allyl-succinic anhydride, 4-methylcyclohex-4-ene-1,2-dicarboxylic anhydride and bicyclo[2.2.1]hept-5-ene-2,3-dicarboxylic anhydride, and the like.

Examples of oxazoline-group containing monomers are oxazole, ricinoloxazoline maleinate, vinyloxazoline, 2-isopropenyl-2-oxazoline, and the like.

Examples of epoxy-group containing monomers are epoxides of esters of unsaturated carboxylic acids containing at least 6, preferably 7 carbon atoms. Particularly preferred are glycidyl acrylate and glycidyl methacrylate, and the like.

Examples of the amino-group containing monomers are reaction-products of primary and/or secondary diamines with an anhydride of an unsaturated carboxylic acid as mentioned above.

Examples of the hydroxy-group containing monomers are reaction products of primary or secondary amino-alcohols (primary or secondary amine) with an anhydride of an unsaturated carboxylic acid as mentioned above.

In case that an amine or hydroxy group is present in the resulting functionalized polymer a coupling agent such as an diisocyanate could be necessary to link this type of functional polymer to the polyamide.

Various known methods can be used to graft the grafting monomer to the basic polymer. For example, this can be achieved by heating the polymer and the grafting monomer at high temperatures of from about 150° C. to about 300° C. in the presence or absence of a solvent with or without a radical initiator. Another vinyl monomer may be present during the grafting reaction. Suitable solvents that may be used in this reaction include benzene, toluene, xylene, chlorobenzene and cumene. Suitable radical initiators that may be used include t-butyl hydroperoxide, diisopropylbenzene hydroperoxide, di-t-butyl peroxide, t-butyl cumyl peroxide, acetyl peroxide, benzoyl peroxide, isobutyryl peroxide and methylethyl ketone peroxide, and the like.

The functionalized polymer can also be made by copolymerization of the functional group-containing monomer with the monomers mentioned above in connection with the polyolefins.

In the functionalized polymer thus obtained, the amount of the functional group-containing monomer is preferably about 0.3 to about 10%, more preferably about 0.3 to about 5%, and most preferably at least about 1 weight %, based on the weight of the functionalized polymer.

The polyamides are preferably selected from polymers of ε-caprolactam, aminocaproic acid, enantholactam, 7-aminoheptanoic acid, 11-aminoundecanoic acid, etc., or polymers obtained by polycondensation of diamines (such as butanediamine, hexamethylenediamine, nonamethylenediamine, undecamethylenediamine, dodecamethylenediamine, m-xylenediamine, etc.) with dicarboxylic acids (such as terephthalic acid, isophthalic acid, adipic acid, sebacic acid, dodecanedibasic acid, glutaric acid, etc.), copolymers thereof or blends thereof. Specific examples include aliphatic polyamide resins (such as polyamide 4.6, polyamide 6, polyamide 6.6, polyamide 6.10, polyamide 11, polyamide 12, and polyamide 6.12) and aromatic polyamide resins (such as poly (hexamethylenediamine terephthalamide), poly (hexamethylene isophthalamide), xylene group-containing polyamides and amorphous polyamide). Among them, polyamide 6, polyamide 6.6, and polyamide 12 are preferred.

It has to be noted that the copolymer of the functionalized polymer and the polyamide can first be prepared as such (e.g. in a single or a twin-screw extruder) and then melt-mixed or dry-blended with the non-polar thermoplastic elastomer and polar thermoplastic composition before processing. Alternatively, the functionalized polymer and polyamide can be melt-mixed with the non-polar thermoplastic elastomer and polar thermoplastic composition in one step. The compatibilizer can be also dry-blended or melt-mixed with either non-polar thermoplastic elastomer or with polar thermoplastic. The melt-mixing of the last option can be made either down-stream during manufacturing of the non-polar thermoplastic elastomer or in a second pass in a Banbury, single or double screw extruder.

Preferably the amount of the functionalized polymer is about 20 to about 70 weight % and the amount of the polyamide is about 80 to about 30 weight %. Most preferably, however, the amount of the functionalized polymer is about 30 to about 60 weight % and the amount of the polyamide is about 70 to about 40 weight %, all amounts based on the total weight of the functionalized polymer and polyamide.

The amount of copolymer obtainable by the reaction of the functionalized polyolefin and the polyamide and the amount of copolymer obtainable by the reaction of the functionalized styrene/conjugated diene/styrene block-copolymer (hydrogenated, non-hydrogenated or partly hydrogenated) and the polyamide in the blend comprising the non-polar thermoplastic elastomer and the polar thermoplastic polymer, whether added to said blend as the copolymer (already reacted) or as blend (not yet reacted) as above-described, is at least 3 weight parts [(i), (ii) or (iii)] per 100 weight parts of the total of non-polar thermoplastic elastomer (A), (B) or (C), and polar thermoplastic polymer as defined above.

4. Additives

The non-polar thermoplastic elastomer, the polar thermoplastic polymer, the compatibilizer and the final compatibilized blend may independently contain reinforcing and non-reinforcing fillers, plasticizers, antioxidants, stabilizers, rubber processing oil, extender oils, lubricants, antiblocking agents, antistatic agents, waxes, foaming agents, pigments, flame retardants and other processing aids known in the rubber compounding art. Such additives can comprise up to about 40 wt %, preferably up to 20 wt % of the total compatibilized blend. Fillers and extenders which can be utilized include conventional inorganics such as calcium carbonate, clays, silica, talc, titanium dioxide, carbon black, and the like. The rubber processing oils generally are paraffinic, naphthenic or aromatic oils derived from petroleum fractions. The oils are selected from those ordinarily used in conjunction with the specific rubber or rubbers present in the composition.

5. Preparation of the Compatibilized Blend

The compatibilized blends of a non-polar thermoplastic elastomer and polar thermo-plastic comprising the compatibilizer copolymer are prepared by melt-mixing the polymers together in the presence of the compatibilizer in a conventional internal mixer, a single screw extruder, a co- or counter-rotation twin-screw extruder, an open mill or any other type of equipment suitable and known in the art. The mixture is heated to a temperature sufficient to melt or to soften the component of the composition which has the highest melting or softening point.

The compatibilizer can be first melt-mixed or tumble blended with the non-polar thermoplastic elastomer or with the polar thermoplastic and then melt-mixed with the second component of the composition.

6. Utility of the Compatibilized Blend

The compatibiiized blends of non-polar thermoplastic elastomer and polar thermo-plastic according to the present invention can be used in different applications like:

i. to get good adhesion between the compatibilized blend of the invention and polar thermoplastic polymers which is necessary if, for instance, parts with a multi-layer structure are provided. This type of parts can be produced by using the traditional processing methods such as co-injection molding and/or over injection molding, co-extrusion and/or over extrusion, co-blow molding and/or over blow molding.

Representative polar thermoplastic polymers are selected from those mentioned above.

In all cases mentioned above, the compatibilized blend of the invention can also be used as an adhesive tie layer between a non-polar thermoplastic elastomer and a polar thermoplastic polymer.

ii. to improve the paintability of non-polar thermoplastic elastomers;

iii. to produce new polymer materials which possess the combined properties of non-polar thermoplastic elastomer and polar thermoplastic polymers.

The invention will better be understood by reference to the following examples which serve to illustrate but not to limit the present invention.

EXAMPLES

The following abbreviations are used in the examples:

S 8211-60: Santoprene® rubber (blend of polypropylene and fully vulcanized EPDM and common additives with a durometer shore A hardness of 60), [Advanced Elastomer Systems, Akron, Ohio, U.S.]

S 691-55: Santoprene® rubber (blend of polypropylene and fully vulcanized EPDM and common additives with a durometer shore A hardness of 55), [Advanced Elastomer Systems, Akron, Ohio, U.S.].

PP-b-PA reaction product of maleated polypropylene having 1.1% grafted maleic anhydride with polyamide 6 (Ultramid® B3 of BASF) at 40/60 weight %

Solef® 11010: Polyvinylidene fluoride-hexafluoropropylene copolymer [Solvay]

Elastollan® C 85 A (TPU): thermoplastic polyurethane based on polyether [BASF]

The following measurement methods were used in the determination of physical properties:

Hardness (Shore A): ISO 868-85

Modulus; Elongation and Tensile Strength: DIN 53405

Tear Strength: ASTM D-624

Typical Examples

1. Preparation of the Compatibilizer (PP-b-PA)

40 weight % of a maleated homo-polypropylene containing 1.1 weight % of grafted maleic anhydride was melt-mixed with 60 weight % of polyamide 6 (Ultramid® B3 of BASF) in a co-rotating intermeshing twin-screw extruder type Leistritz LSM 33/34.

The following temperature setting profile has been used:

| | |
|---|---|
| Zone 1 and 2 | 229° C. |
| Zone 3 and 4 | 230° C. |
| Zone 5 | 231° C. |
| Zone 6 to 10 | 232° C. |

An under-water strand cutting system was used for the pelletization of the compatibilizer thus obtained.

2. Preparation of a Compatibilized Blend of a Non-polar Thermoplastic Elastomer with a Polar Thermoplastic Polymer S8211-60, PVDF Solef 11010 and the compatibilizer was first tumble-blended and then fed into a laboratory single extruder. Extrusion graph type 19/25 D with metering screw (screw with mixing element) with the following temperature setting profile:

180° C. (feeding zone)-190-210-200 (die).

Melt-temperature (actual measurement)=250° C.

RPM=70

Back pressure=20 bars

The final product is pelletized through an under water strand cutting system.

TABLE 1

| Composition | 1 | 2* |
|---|---|---|
| S 8211-60 | 70 | 70 |
| PP-b-PA (40/60) | 10 | — |
| Solef 11010 | 20 | 30 |
| Hardness (5 sec.) Shore A | 87 | — |
| Direction ⊥ to flow | | |
| Mod. at 100% (MPa) | 4.4 | — |
| Elongation at Break (%) | 234 | — |
| Tensile at Break (MPa) | 4.9 | — |
| Direction ∥ to flow | | |
| Mod. at 100% (MPa) | 4.6 | — |
| Elongation at Break (%) | 274 | — |
| Tensile at Break (MPa) | 5.2 | — |
| Tear (N/mm) | | |
| direction ⊥ to flow | 34 | — |
| direction ∥ to flow | 36 | — |

*Product was not processable due to a strong delamination

TABLE 2

| Composition | 3 | 4 |
|---|---|---|
| S 691-55 | 70 | 80 |
| Elastollan ® C 85A (TPU) | 30 | 20 |
| PP-b-PA (40/60) | 10 | — |
| Hardness (5 sec.) Shore A | 77 | 65 |
| Direction ⊥ to flow (DIN 53505) | | |
| Mod. at 100% (MPa) | 3.8 | 2.1 |
| Elongation at Break (%) | 320 | 223 |
| Tensile (MPa) | 6.4 | 2.9 |
| Direction ∥ to flow | | |
| Mod. at 100% (MPa) | 3.3 | 2.6 |
| Elongation at Break (%) | 260 | 185 |
| Tensile (MPa) | 4.9 | 3.1 |
| Tear Strength /N/mm) (ASTM D624) | | |
| Direction ⊥ to flow | 31.5 | 19.7 |
| Direction ∥ to flow | 29.4 | 19.2 |
| Comment on injection molded plaque | — | delamination |

A comparison of inventive example 3 with comparative example 4 shows that the final product of example 4 has poor physical properties due to delamination caused by non-compatibility of the non-polar thermoplastic elastomer (S 691-55) with the polar thermoplastic polymer (Elastollan®).

I claim:

1. A compatibilized blend comprising:
  A) a non-polar thermoplastic elastomer comprising a thermoplastic polyolefin homopolymer or copolymer and an olefin rubber which is fully crosslinked or partially crosslinked; and
  B) a polar thermoplastic polymer selected from the group consisting of thermoplastic polyurethane (TPU), chloro containing polymers, fluoro containing polymers, polyesters, acrylonitrile-butadiene-styrene copolymers, styrene-acrylonitrile copolymers, styrene-maleic anhydride copolymer, polyacetal, polycarbonate, and polyphenylene oxide; and
  C) a compatibilizer selected from the group consisting of
    a) a condensation copolymer of
      10 to 90 weight % of a functionalized olefin polymer with
      90 to 10 weight % of a polyamide, based on the total weight of functionalized polymer and polyamide, or
    b) a blend of a functionalized olefin polymer and a polyamide in the amounts defined under (a) or
    c) a mixture of (a) and (b),
  under the proviso that the functionalized polymer contains no less than 0.3 weight %, based on the total weight of the functionalized polymer, of at least one functional group-containing monomer.

2. The blend of claim 1, wherein at least 1 weight part of the compatibilizer (C) is added per 100 weight parts of the blend comprising the non-polar thermoplastic elastomer (A) and the polar thermoplastic polymer (B).

3. The blend of claim 1, wherein the thermoplastic polyolefin of (A) is a homopolymer or copolymer of a $C_{2-7}$ monomer or a copolymer thereof with (meth)acrylates and/or vinyl acetates.

4. The blend of claim 3, wherein the copolymer is a copolymer of ethylene with (meth)acrylates and/or vinyl acetates.

5. The blend of claim 1, wherein the rubber is selected from the group consisting of EPDM rubber, EPM rubber, butyl rubber, halogenated butyl rubber, copolymers of isomonoolefin and para-alkylstyrene or their halogenated derivatives, natural rubber, polyisoprene, polybutadiene rubber, styrene-butadiene-copolymer rubbers, nitrile rubbers, polychloroprene rubbers and mixtures thereof.

6. The blend of claim 1, wherein the blend comprising (A) and (B) contains about 5 to about 95 weight % of (A), based on the total weight of (A)+(B).

7. The blend of claim 1, wherein the functionalized olefin polymers are obtained by grafting on the polyolefins grafting monomers selected from the group consisting of carboxylic acids, dicarboxylic acids or their derivatives, oxazoline-group containing monomers, epoxy-group containing monomers, and amino- or hydroxy-group containing monomers.

8. The blend of claim 7, wherein the derivatives of the dicarboxylic acid monomers are their anhydrides.

9. The blend of claim 1, wherein the thermoplastic polyurethane is obtained by the reaction of at least one organic diisocyanate, at least one polymeric diol and at least one difunctional chain extender.

10. A shaped article comprising the blend as defined in claim 1.

11. A method of compatibilizing blends comprising blending

A) a non-polar thermoplastic elastomer comprising a thermoplastic polyolefin homopolymer or copolymer and an olefin rubber which is fully crosslinked or partially crosslinked; and B) a polar thermoplastic polymer selected from the group consisting of thermoplastic polyurethane (TPU), chloro containing polymers, fluoro containing polymers, polyesters, acrylonitrile-butadiene-styrene copolymers, styrene-acrylonitrile copolymers, styrene-maleic anhydride copolymer, polyacetal, polycarbonate, and polyphenylene oxide, with a compatibilizer selected from the group consisting of a) a copolymer obtained by condensation reaction of
  10 to 90 weight % of a functionalized olefin polymer with
  90 to 10 weight % of a polyamide, based on the total weight of functionalized polymer and polyamide, or b) a blend of a functionalized olefin polymer and a polyamide in the amounts defined under (a) or c) a mixture of (a) and (b), under the proviso that the functionalized polymer contains no less than 0.3 weight %, based on the total weight of the functionalized polymer, of at least one functional group-containing monomer.

* * * * *